(12) United States Patent
Zhen et al.

(10) Patent No.: US 9,523,527 B2
(45) Date of Patent: Dec. 20, 2016

(54) HOLLOW ICE-MAKING FORMING MOULD AND USAGE THEREOF

(75) Inventors: Shihua Zhen, Regina (CA); Deqin Xu, Kaiping (CN)

(73) Assignee: Shihua Zhen, Regina, Saskatchewan (CA)

( * ) Notice: Subject to any disclaimer, the term of this patent is extended or adjusted under 35 U.S.C. 154(b) by 588 days.

(21) Appl. No.: 14/112,654

(22) PCT Filed: Jun. 23, 2011

(86) PCT No.: PCT/CN2011/076189
§ 371 (c)(1),
(2), (4) Date: Oct. 18, 2013

(87) PCT Pub. No.: WO2012/167454
PCT Pub. Date: Dec. 13, 2012

(65) Prior Publication Data
US 2014/0151928 A1     Jun. 5, 2014

(30) Foreign Application Priority Data

Jun. 7, 2011 (CH) .................... 2011 2 0188102 U

(51) Int. Cl.
*F25C 5/06* (2006.01)
*F25C 1/22* (2006.01)
*F25C 1/04* (2006.01)

(52) U.S. Cl.
CPC . *F25C 1/22* (2013.01); *F25C 1/04* (2013.01); *F25C 2500/02* (2013.01)

(58) Field of Classification Search
CPC ............... F25C 1/04; F25C 1/22; F25C 1/225
See application file for complete search history.

(56) References Cited

U.S. PATENT DOCUMENTS

| 1,123,537 A * | 1/1915 | Huizer ...................... F25C 1/22 215/12.1 |
| 5,884,490 A | 3/1999 | Whidden |
| 2010/0276567 A1 | 11/2010 | Macalister |

FOREIGN PATENT DOCUMENTS

| WO | 9812488 | 3/1998 |
| WO | 2009104179 | 8/2009 |

\* cited by examiner

*Primary Examiner* — Orlando E Aviles Bosques
(74) *Attorney, Agent, or Firm* — Kyle R. Satterthwaite; Ryan W. Dupuis; Ade & Company Inc.

(57) ABSTRACT

A hollow ice-making forming mold comprises an inner membrane (1) which is in a fixed shape after charging air and an outer membrane (2) which is in a fixed shape after liquid injection and is disposed outside the inner membrane (1); a base plate (3) is arranged at the bottom of the outer membrane (2); the bottoms of the inner and outer membranes are hermetically connected with the base plate (3) respectively, wherein an airtight air chamber (5) is formed between the inner membrane (1) and the base plate (3), and a cavity (6) for pouring cooling liquid is formed between the inner membrane (1) and the outer membrane (2); an air filling and water injecting member (4) is provided at the top of the inner membrane (1); a top part of the outer membrane (2) is connected with an upper part of the air filling and water injecting member (4) by a detachable way. A usage of the mold comprises charging the air chamber (5) through an air inlet (41), closing the air inlet (41), connecting the outer membrane (2) and the air filling and water injecting member (4), injecting the liquid into the cavity (6) through an injection hole (42), disposing the mold in a cooling environment, detaching the connection between the outer membrane (2) and air filling and water injecting member (4), discharging the air of the air chamber and obtaining the molded ice block.

6 Claims, 2 Drawing Sheets

HOLLOW ICE-MAKING FORMING MOULD AND USAGE THEREOF

TECHNICAL FIELD

The present invention relates to a mould, in particular, it relates to a hollow ice making forming mould and the usage thereof.

BACKGROUND ART

Up to date, the well known hollow liquid-cooling ice making molding method comprises making the mould with shape-fixed metal or plastic mould core and mould cavity, then injecting a liquid into the forming mould, cooling to make the liquid cool down and form a fixed shape, and finally opening the mould, removing the mould core to obtain the product. Due to the fact that the shapes of the mould core and mould cavity are fixed in this method, it leads to the issues including the volume of the forming mould is quite large, which makes it inconvenient for usual storage and transport; as well as makes the manufacturing cost pretty high. In the case of making an ice block with complex shape, there may also be problems such as the mould core being hardly removable, or even irremovable.

SUMMARY OF INVENTION

In order to overcome the drawbacks of the prior art, the present invention has provided a hollow ice-making forming mould with small size, simple structure and low manufacturing cost.

The technology solution of the present invention to solve the technical problem is:

A hollow ice-making forming mould comprises an inner membrane which is in a fixed shape after being charged with air, and an outer membrane which is also in a fixed shape after being injected with water and is disposed outside the inner membrane; a base plate is arranged at the bottom of the outer membrane; the bottoms of the inner and outer membranes are hermetically connected with the base plate respectively, wherein an airtight air chamber is formed between the inner membrane and the base plate; and a mould cavity for pouring cooling liquid is formed between the inner membrane and the outer membrane; an air filling and water injecting member is provided at the top of the inner membrane; at least one liquid injection hole is arranged on one side of the air filling and water injecting member where the member is connected to the mould cavity; a top part of the outer membrane is connected with an upper part of the air filling and water injecting member in a detachable way, in order to open the outer membrane to disassemble the forming mould; the our membrane is installed with a zipper; a layer of waterproof membrane is arranged at the back of the zipper, in order to enhance the waterproof effect and effectively prevent leaking of the liquid from the mould cavity. In the present invention, the distance between the inner membrane and outer membrane is relative small, and can be mainly used to make the thin-walled ice blocks.

A usage method of the hollow ice-making forming mould, comprising the following producing steps:

1) charging the air chamber that is formed by the inner membrane and the base plate through the air inlet located on the air filling and water injecting member, closing the air inlet when the inner member's shape is fixed, using the air charged inner membrane as the mould core of the forming mould;

2) connecting the outer membrane and the air filling and water injecting member, and zipping up the zipper;

3) injecting the to be molded cooling liquid into the mould cavity located between the inner membrane and the outer membrane through the liquid inlet on the air filling and water injecting member, until the shape of the outer membrane is fixed under the effect of liquid tension;

4) placing the liquid filled forming mould into a cooling environment;

5) detaching the connection part between the outer membrane and the air filling and water injecting member after the liquid becomes ice and forms a fixed shape, then unzipping the outer membrane's zipper, releasing the air in the inner membrane, disassembling the forming mould and removing the mould core to obtain the molded ice block.

The beneficial effects of the present invention are: this hollow ice-making forming mould uses air-filled inner membrane as the mould core, whose shape can be changed. In this way, the forming mould can be maintained in a small volume when not in use, and can be conveniently transported and stored. After the ice block is molded, it is also convenient to perform the operation of removing the mould core to the inner and outer membranes. Additionally, this forming mould has a pretty low manufacturing cost. The application method of using this mould to make ice blocks is with a simple operation and makes it easy to be promoted.

BRIEF DESCRIPTION OF DRAWINGS

The following is a further description of the present invention in reference to the accompanying drawings and embodiments.

DESCRIPTION OF EMBODIMENTS

Figure 1:
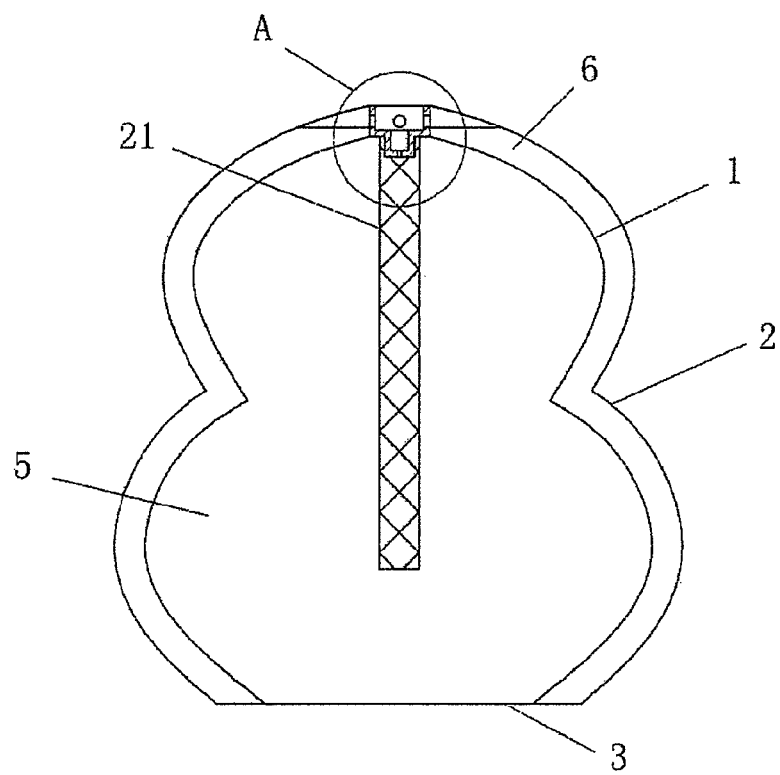
FIG. 1 is an embodiment of the present invention.
Figure 2:
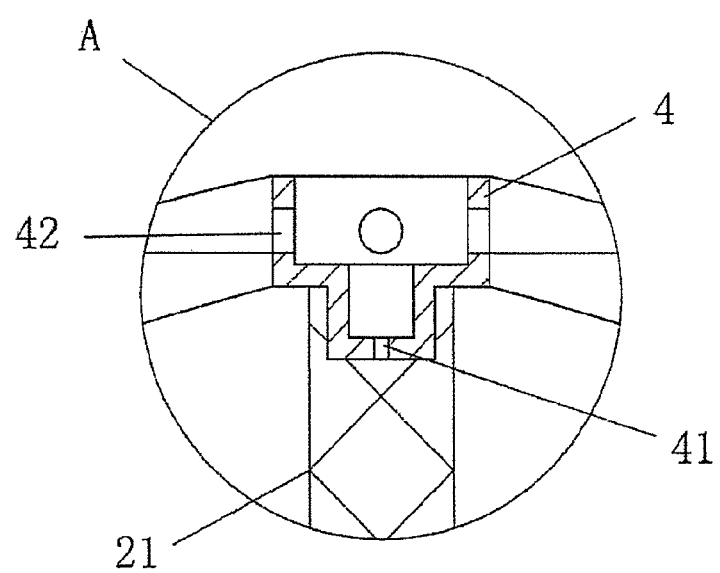
FIG. 2 is an enlarged view of the A in the FIG. 1.

In reference to FIGS. 1 and 2, one embodiment of the present invention comprises, the inner membrane 1 that is made of hard plastic, and in a gourd shape when filled with air; the outer membrane 2 that is similarly made of hard plastic and also in a gourd shape when filled with water, is arranged outside of the inner membrane 1. A base plate 3 is arranged at the bottom of the outer membrane 2. The base plate 3 is a metal base plate with a high compressive strength. The bottoms of the inner membrane 1 and outer membrane 2 are hermetically connected with the base plate 3, respectively. An airtight air chamber 5 is formed between the inner membrane 1 and the base plate 3. An air filling and water injecting member 4 is provided at the top of the inner membrane 1. The air inlet 41 that is connected to the air chamber 5 is arranged at the bottom of the air filling and water injecting member 4. The air inlet 41 is disposed with a switch to control its open and close. At least one liquid injection hole 42 is set on one side of the air filling and water injecting member 4. A top part of the outer membrane 2 is connected with an upper part of the air filling and water injecting member 4 in a detachable way to make the liquid injection hole 42 located in between the inner membrane 1 and the outer membrane 2. The mould cavity 6 is formed between the inner membrane 1 and the outer membrane 2, which can be injected with the cooling liquid through the liquid injection hole 42. In the present invention, the distance between the inner membrane 1 and the outer membrane 2 is relatively small. Hence it is mainly used to make the thin-walled ice blocks.

Furthermore, a zipper 21 is arranged on the outer membrane 2. A layer of foldable waterproof membrane is disposed at the back of the zipper 21, in order to prevent water leaking from the location of the zipper. When the zipper 21 is opened, the waterproof membrane is expanded; and when the zipper 21 is closed, the waterproof membrane is folded to the back of the zipper 21. When the ice is molded, the zipper 21 is first opened to expand the waterproof membrane thus makes the open of the outer membrane 2 become bigger so as to allow the outer membrane 2 to be conveniently removed. In addition, the TPU membrane or PVC membrane can be used to stick to the back of the zipper 21, in order to enhance its waterproof effect.

During the process of ice making: 1) air is filled into the air cavity 5 through the air inlet 41 of the air filling and water injecting member 4. The air inlet 41 is closed when the shape of the inner membrane 1 is fixed. In one embodiment of the present invention, the inner membrane 1 is fixed to a gourd-like shape as the mould core of the forming mould; 2) connecting the outer membrane 2 and the air filling and water injecting member 4, and closing the zipper 21; 3) injecting the to be molded cooling liquid into the mould cavity 6 located in between the inner membrane 1 and the outer membrane 2 through the liquid inlet 42 of the air filling and water injecting member 4, until the shape of the outer membrane is fixed under the effect of the liquid tension. Similarly, the outer membrane 2 is also in a gourd-like shape; 4) Placing the liquid filled forming mould into a cooling environment; 5) detaching the connection part between the outer membrane 2 and the air filling and water injecting member 4 after the liquid is cooled to form the molded ice, and unzipping the outer membrane's zipper 21, releasing the air in the air cavity 5, disassembling the forming mould and removing the mould core to obtain the molded ice block.

Figure 3:
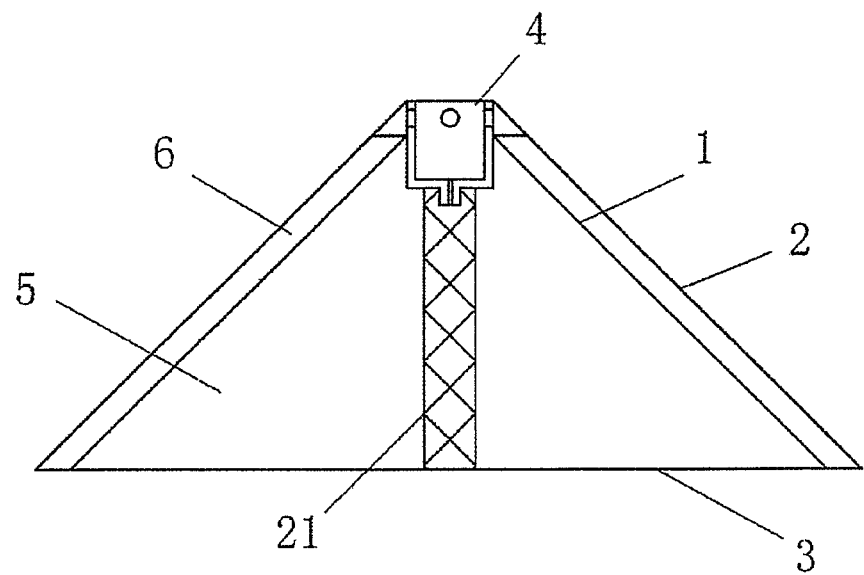
FIG. 3 is the second embodiment of the present invention.
Figure 4:
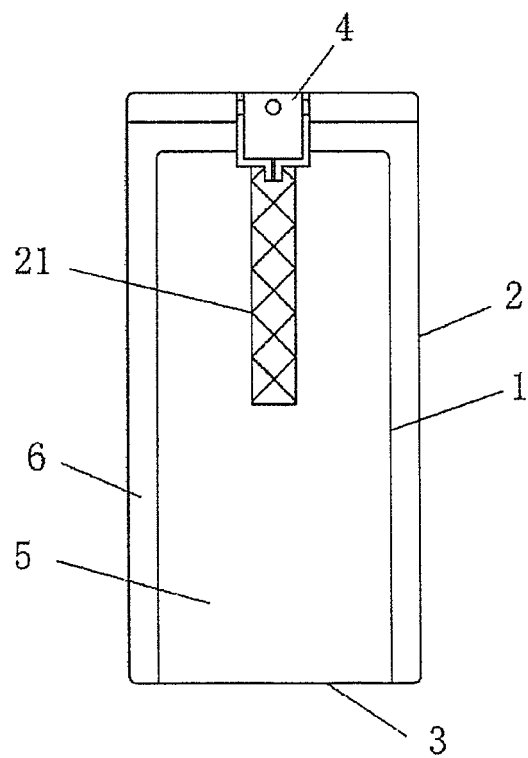
FIG. 4 is the third embodiment of the present invention.

In reference to FIG. 4, in the third embodiment of the present invention, the inner membrane 1 and the outer membrane 2 are made in a cylinder shape after being filled with air or liquid, respectively; in reference to FIG. 3, in the second embodiment of the present invention, the inner membrane 1 and the outer membrane 2 are made in a cone shape after being filled with air or liquid, respectively. The design of the present invention uses the inner membrane 1 and the outer membrane 2, whose shapes are fixed after being filled with air or liquid, as the mould core and mould cavity. It has a low manufacturing cost and is easy to produce. Additionally, due to the fact that the shapes of the membranes can be changed prior to being filled with air or liquid, and the mould core can be conveniently removed, it can be used to make the mould core and mould cavity with complex shapes, in order to make the ice blocks with more different shapes. The foregoing is only certain preferred embodiments of the present invention. Any technology solution that uses a generally similar method to achieve the objective of the present invention is also within the scope of the present invention.

The present invention is mainly used to make the baseless thin-walled decoration ice blocks. Since the shapes of the inner membrane 1 and outer membrane 2 can be changed prior to their air or liquid filling, this forming mould can be maintained in a small size when it is not in use to allow a convenient transport and storage. When the ice has been molded, the inner membrane 1 and outer membrane 2 can be conveniently performed a mould core removing operation. In addition, this mould is with a low manufacturing cost and diverse shapes. The ice-making method using this mould is of simple operation, and hence can be easily promoted.

What is claimed is:

1. A hollow ice-making forming mould, comprising an inner membrane (1) which is in a fixed shape after being charged with air, and an outer membrane (2) which is in a fixed shape after liquid injection and is disposed outside the inner membrane (1), a base plate (3) is arranged at a bottom of the outer membrane (2); the bottom of the outer membrane and a bottom of the inner membrane are hermetically connected with the base plate (3) respectively, a liquid cavity (6) for receiving the liquid being injected is formed between the inner and outer membranes (1, 2); an air filling and liquid injecting member (4) for filling air into an air cavity (5) and injecting the liquid into the liquid cavity (6) is provided at a top of the inner membrane (1); a top part of the outer membrane (2) is connected with an upper part of the air filling and liquid injecting member (4) in a detachable way, and a zipper (21) is disposed on the outer membrane (2) to allow opening the outer membrane (2) for removing a molded ice block formed in the liquid cavity.

2. The hollow ice-making forming mould of claim 1, wherein: a waterproof membrane is arranged at a back of the zipper (21).

3. The hollow ice-making forming mould of claim 1, wherein: an air inlet (41) is disposed at bottom of the air filling and liquid injecting member (4) to connect to the air cavity (5), the air inlet (41) is provided with a switch to control opening and closing thereof.

4. The hollow ice-making forming mould of claim 1, wherein: at least one liquid inlet (42) is provided on one side of the air filling and liquid injecting member (4) where the member is connected to the liquid cavity (6).

5. The hollow ice-making forming mould of claim 1, wherein: the base plate (3) is a metal base plate.

6. A usage of a hollow ice-making forming mould, comprising the following steps:
   1) filling air to an air cavity (5) formed by an inner membrane (1) and a base plate (3) through an air filling and liquid injecting member (4), closing an air inlet (41) when the shape of the inner membrane (1) is fixed, and using the air-filled inner membrane (1) as a mould core;
   2) connecting an outer membrane (2) and the air filling and liquid injecting member (4), and closing a zipper (21) which is located on the outer membrane (2);
   3) injecting the to be molded liquid into a mould cavity (6) between the inner membrane (1) and the outer membrane (2) through the air filling and liquid injecting member (4), until the shape of the outer membrane (2) is fixed under an effect of liquid tension;
   4) placing the liquid filled mould into a cooling environment for producing a molded ice block;
   5) detaching a connection part between the outer membrane (2) and the air filling and liquid injecting member (4) after the liquid becomes the molded ice block, then unzipping the zipper (21) of the outer membrane (2), releasing the air from the air cavity (5), disassembling the mould and removing the mould core to obtain the molded ice block.

* * * * *